UNITED STATES PATENT OFFICE.

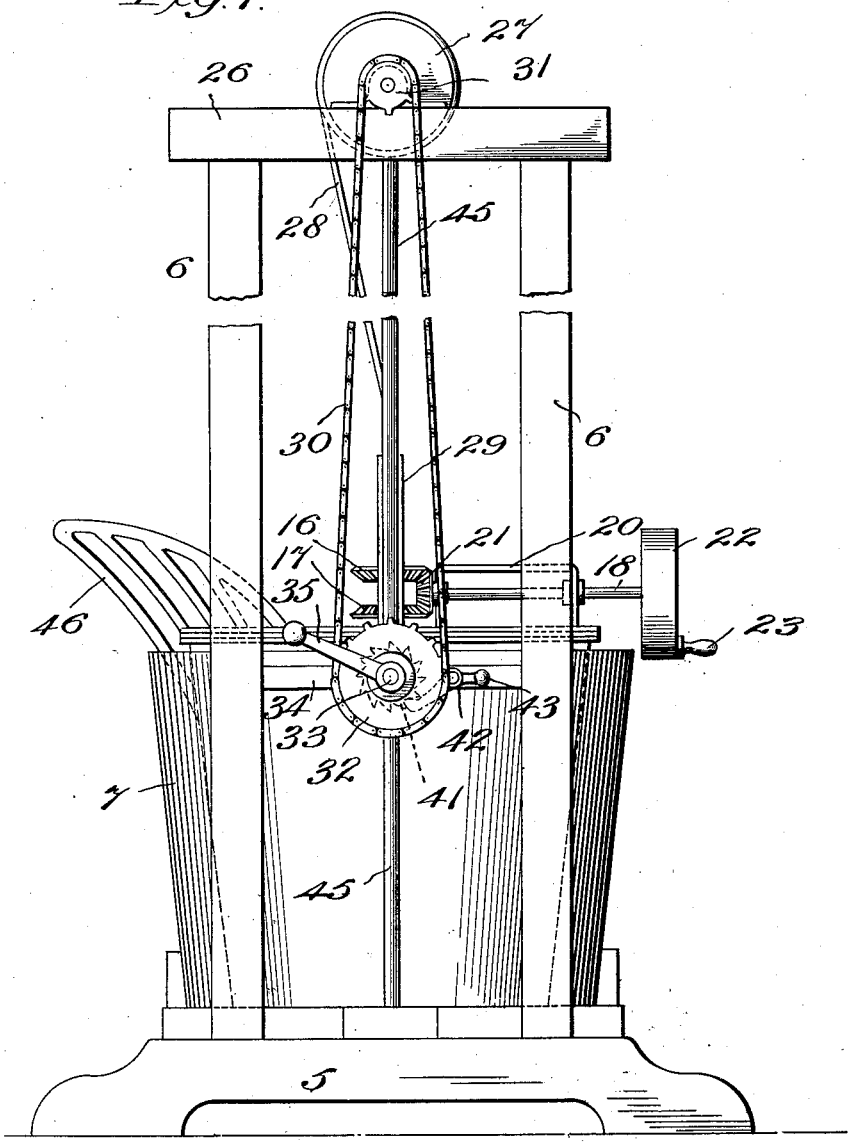

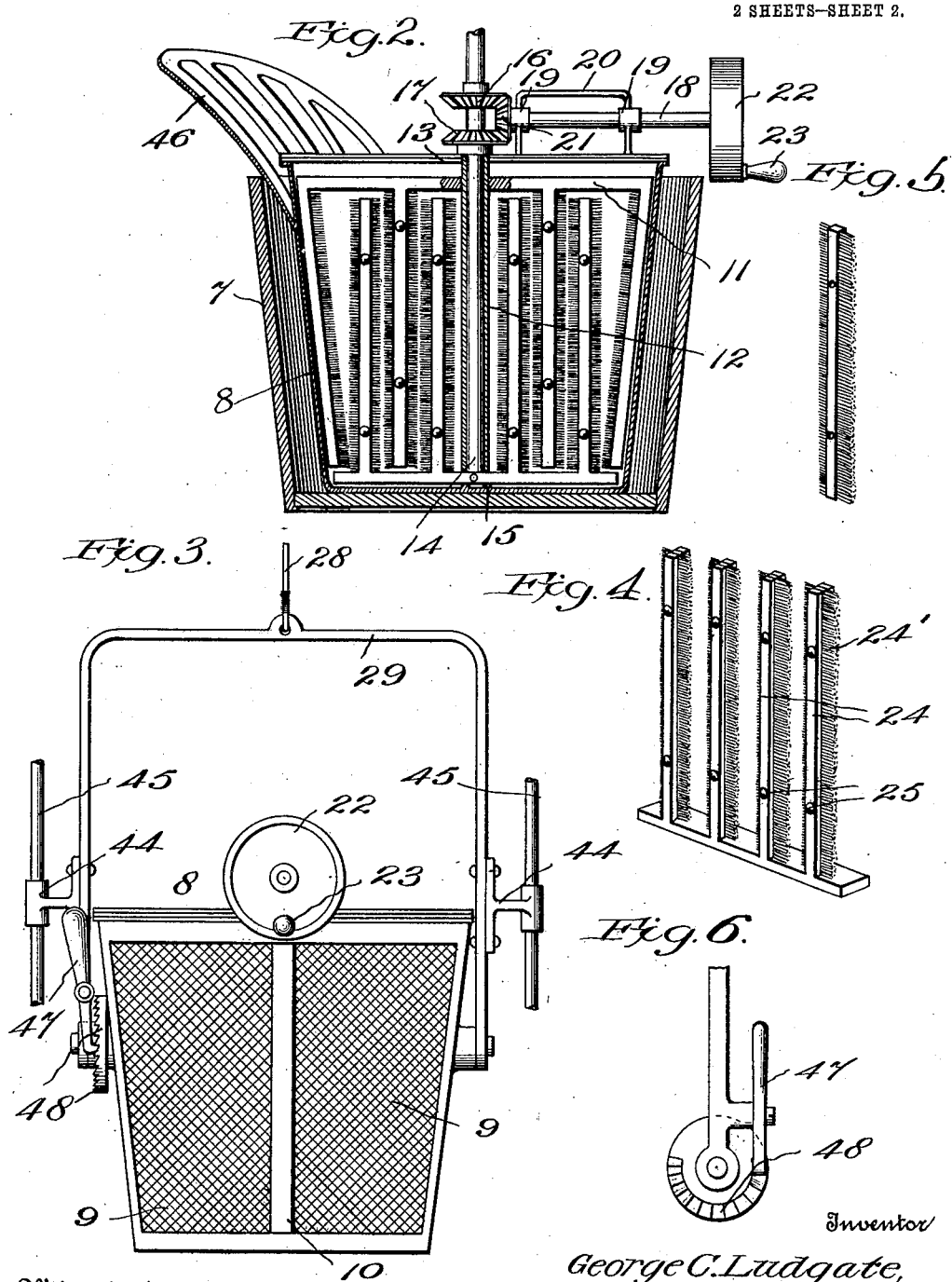

GEORGE C. LUDGATE, OF BROOKLYN, NEW YORK.

VEGETABLE-WASHER.

1,097,103.  Specification of Letters Patent.  Patented May 19, 1914.

Application filed September 10, 1912. Serial No. 719,600.

*To all whom it may concern:*

Be it known that I, GEORGE C. LUDGATE, a citizen of the United States, residing at Brooklyn, in the county of Kings and State of New York, have invented new and useful Improvements in Vegetable - Washers, of which the following is a specification.

The general object of the invention is to effect in a simple, economical and expeditious manner, the cleaning or scrubbing of vegetables such as potatoes, parsnips and the like, after such vegetables are taken from the ground and prior to presenting them for sale in the open market. And to this end the invention consists in a liquid holding receptacle adapted for containing the vegetables to be washed or scrubbed, and turnable washing mechanism arranged so as to operate on the vegetables in the receptacle.

Other objects will appear and be better understood from that embodiment of my invention of which the following is a specification, reference being had to the accompanying drawings forming a part hereof, in which:—

Figure 1 is a contracted side elevation of the device. Fig. 2 is a detail vertical section of the washing apparatus. Fig. 3 is a detail side elevation of the basket looking at right angles to Fig. 2. Fig. 4 is a detail perspective of one series of scrubbers. Fig. 5 is a detail perspective view of one of the scrubbers removed from the frame, and Fig. 6 is a detail view of the basket releasing device.

The platform support 5 arranged in the lower end of an upright frame 6 is designed to form a bearing or support for the outer receptacle 7, which may be formed of any material found suitable for the purpose, as metal, and designed so as to contain washing fluids, as water, and further designed to receive the basket 8 which is of such volume as to conveniently hold a relatively large amount of vegetables, as potatoes. The side walls 9 of the basket 8, are perforated structures and may, if so desired, be formed of screen wire stretched over skeleton upright frames, one of which is shown in Fig. 3 and indicated by 10.

The scrubbers consist of two series of uprights each of said series extending in a direction opposed to the other and connected at one end to a cross piece 11. The upper cross piece 11 is fixed to a hollow shaft 12 having one end journaled in a cross piece 13 at the upper end of the basket 8, while the lower cross piece is fixed to an inner shaft 14 which has its lower end stepped in a bearing 15 in the bottom of the basket, and its upper end extending beyond the corresponding end of the shaft 12 and provided with a bevel gear 16 which is opposed to a bevel gear 17 fixed to the shaft 12. A drive shaft 18 journaled in bearings 19—19 on a suitable bracket 20 which is carried by the cross piece 13, has at one end a bevel pinion 21 which meshes with the bevel gears 16 and 17 while its outer end is provided with a balance wheel 22 and a handle 23 which serves as a means by which the operator may rotate the shaft 18 and cause the shafts with their scrubbers, to rotate in opposite directions or relatively to each other. The uprights 24 in each series rotate in planes concentric with the plane of movement of the uprights of the other series and, as shown in Fig. 4, each upright is divided longitudinally to receive a brush 24′ which is secured to the upright by means of bolts 25. The dividing of the uprights admits of easily connecting the brushes to or disconnecting them from the uprights.

A horizontally disposed frame 26 is arranged at the upper end of the upright frame 6 and has bearings for the opposite ends of the shaft of a drum 27, around which is coiled a flexible cable 28 which is connected with the bail 29 of the basket 8. A sprocket chain 30 connects a sprocket wheel 31 on the shaft of the drum 27, with a sprocket wheel 32 fastened to a shaft 33 having a suitable bearing in a cross piece 34 in the upright frame 6. A crank handle 35 secured to the shaft 33, is provided for turning the drum 27 through its connections, with the shaft 33 and a pawl 42 coöperates with a ratchet 41, to prevent accidental return movement of the parts.

In use, the washing fluid such as water, is introduced into the tub or outer receptacle 7, and with the basket arranged in the tub as shown in Figs. 1 and 2, the water will pass into the basket through the perforated side walls 9 thereof. The material to be washed is introduced into the basket and when the shaft 18 is turned by operating the crank handle 23, the scrubbers will operate to agitate the mass of material in the basket, thereby turning the individual pieces and by such contact operating to remove or scrub each piece. Since the scrubbing mechanism may be caused to turn at a relatively high speed, it is manifest that the operation of cleaning the vegetables may be performed in a minimum of time. After the vegetables have been cleaned in the manner just described, the drum 27 is rotated so as to coil thereon the cable 28. This has the effect of elevating the basket 8 to a position above the tub or outer receptacle 7. The basket during its upward movement is guided by means of arms 44—44. These arms are fixed on the bail 29 and slidingly fitted on upright guide bars 45—45, which have their lower ends secured to the platform support 5. When the basket is clear of the tub or outer receptacle 7, it is tilted by pushing on its end, and the contents of the basket are directed by the spout 46 into a barrel, crate or other suitable receptacle adapted for holding the articles during shipment to and while displayed in the market. When tilted, the basket is held against return movement by a dog 47 and a toothed wheel 48, these elements being respectively connected to the bail and basket. After the discharging of the basket the dog is moved from engagement with the ratchet, whereupon the basket will assume its normal vertical position, after which the lowering of the basket into the tub, is effected by disengaging the pawl 42 from the ratchet 41, and suffering the elevating mechanism to turn moderately under the pull exerted by the basket.

What is claimed as new is:

A machine as described comprising a frame, a receptacle located thereon, a bail guided for vertical movement along the frame, means mounted upon the frame for moving the bail, a foraminous basket adapted to enter the receptacle and pivotally supported by the bail, means for holding the basket against pivotal movement with relation to the bail when the basket is above the upper edge of the receptacle, a shaft journaled at the upper portion of the frame, a drum mounted on said shaft, a cable arranged to wind on the drum and connected with the bail, a sprocket wheel fixed to the shaft, a sprocket wheel journaled upon the frame and having a handle, a chain trained around the said sprocket wheels, and pawl and ratchet means for holding the last mentioned sprocket wheel against rotation in one direction.

In testimony whereof I affix my signature in presence of two witnesses.

GEORGE C. LUDGATE.

Witnesses:
JOHN A. DONEGHER,
GEO. H. BYRNE.

Copies of this patent may be obtained for five cents each, by addressing the "Commissioner of Patents, Washington, D. C."